United States Patent [19]

Friesenborg et al.

[11] 4,069,143

[45] Jan. 17, 1978

[54] PURIFICATION APPARATUS FOR WATER PURIFICATION AND PURIFICATION SYSTEM THEREFOR

[75] Inventors: Bernd Friesenborg, Willich; Helmut Eberhardt, Monchen-Gladbach, both of Germany

[73] Assignee: Transportbeton-Beratungs-Gesellschaft mit beschrankter Haftung, Ratingen, Germany

[21] Appl. No.: 689,861

[22] Filed: May 25, 1976

[30] Foreign Application Priority Data

June 6, 1975 Germany .............................. 7518028

[51] Int. Cl.² .............................................. B03B 7/00
[52] U.S. Cl. .................................. 209/10; 210/532 R
[58] Field of Search .................. 210/513, 518, 532 R, 210/532 S, 533, 83, 198 R, 205, 241, 187, 384, 232, 236, 237, 400, 401; 209/10

[56] References Cited

U.S. PATENT DOCUMENTS

| 894,240 | 7/1908 | Taylor | 210/532 R X |
|---|---|---|---|
| 2,503,875 | 4/1950 | Kern | 210/384 |
| 2,909,285 | 10/1959 | Besler | 210/533 X |
| 3,393,149 | 7/1968 | Conley et al. | 210/513 X |
| 3,800,949 | 4/1974 | Duval | 210/241 X |
| 3,899,426 | 8/1975 | Hirs | 210/400 X |
| 3,907,682 | 9/1975 | Basseet | 210/187 X |

*Primary Examiner*—William A. Cuchlinski, Jr.
*Attorney, Agent, or Firm*—Martin A. Farber

[57] ABSTRACT

A purification apparatus for water purification with a settling device for sediment which, settling device comprises a settling vessel and a separate sediment container, which for the purification, stand open in communicative connection with each other in the assembled condition and are sealed tightly in the connection plane toward the outside by a seal, and for exchange of the sediment container are constructed moveable relative to each other. The settling vessel is supported with a roller wagon on running rails, which roller wagon has longitudinally variable supports which each comprises a telescopic tube with a spring arranged therein. A purification system includes a separation device and a collection vessel in inlet and outlet communication, respectively, with the settling vessel, the separation device including a vibrating screen, a supply line entering the settling vessel, and a purge from the collection vessel spraying water on the screen.

2 Claims, 9 Drawing Figures

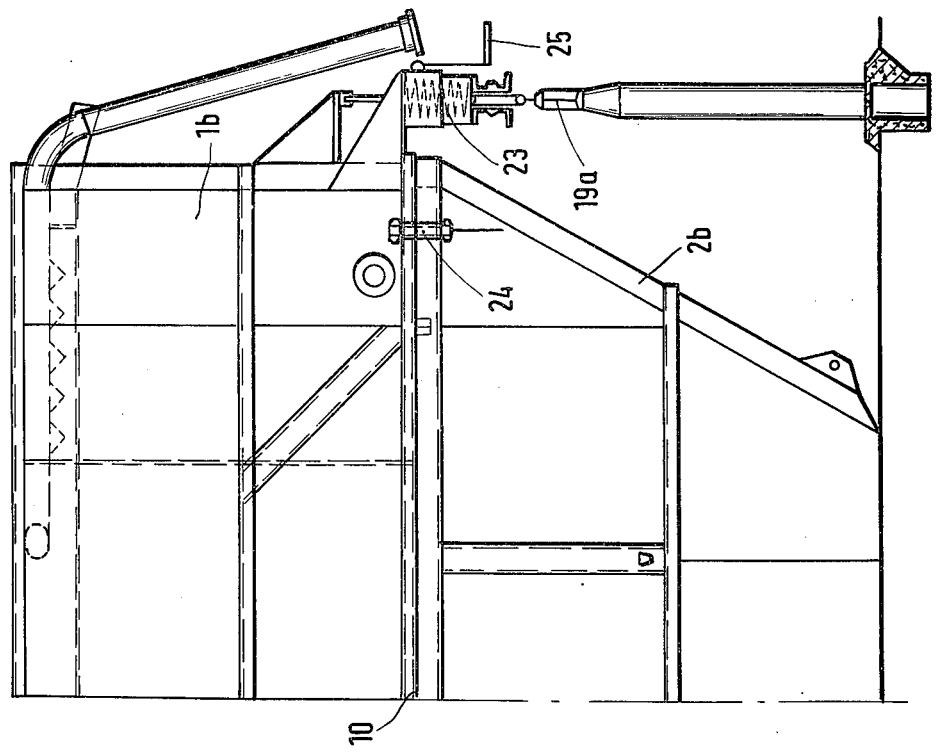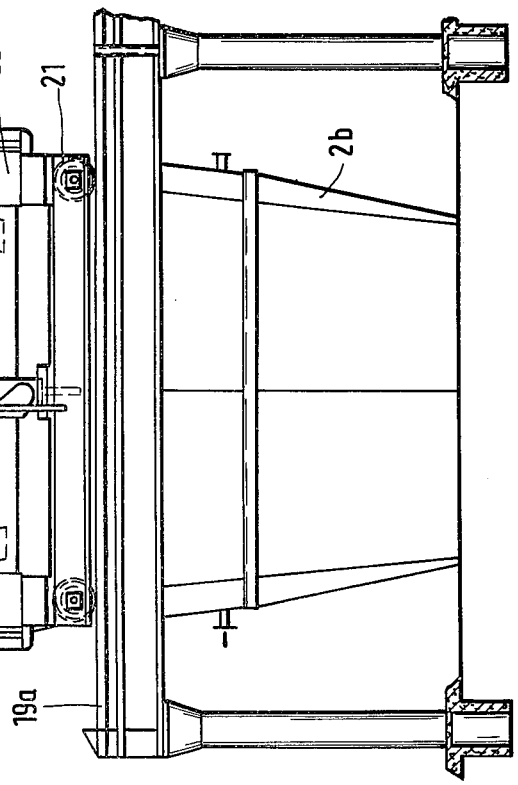

PURIFICATION APPARATUS FOR WATER PURIFICATION AND PURIFICATION SYSTEM THEREFOR

The present invention relates to a purifying apparatus for water purification with a settling device for the solids, debris or sediment and a purification system appropriate therefore for waste water which is concentrated with cement and/or lime and additives or aggregate matter.

As far as the sediment which accumulates during water purification in the form of slurry does not possess active constituents, the slurry thus also is flowable form is able to be dumped or deposited; no special problems arise. In many cases, for example, in fresh concrete-concrete block-or-precast stone-plants and precasting-plants, however, active materials in the form of cement and/or lime are contained in the sediment which accumulates as slurry, which at the time must be purified further with the aid of various settling systems. The end products of this purification comprise alkaline waste waters with different high portions of suspended matter and cement- and lime-slurries, which because of their consistency and alkalinity can not be dumped or deposited, since particularly during rainfall the ground water could be contaminated. Theoretically the possibility indeed exists to further treat the obtained, still flowable cement- and lime-slurry, respectively, in presses, into set or binded, depositable blocks; however such presses are extraordinarily expensive and because it concerns filter presses, it is associated with very high service and operating costs.

The present invention consequently is based on the task and object to produce a purifying apparatus for the water purification and a purification system suited therefore, which is of simple construction, has a great functional and operational security, and by which the sediment contained in the waste water together with the still not hardened active materials, for example cement and/or lime, can be obtained such that it is directly or immediately capable of being dumped or it can be further processed as raw materials for the production of fodder or feed, manure and as filling materials for other products, respectively, whereas the accumulation, for example alkaline waste water, can be led back again as industrial water in the circuit course.

The solution of this task in accordance with another object of the invention, resides in that the settling device comprises a settling tank or vessel and a separate sediment container, which for the purification, stand open in communicative connection with each other in the assembled condition and are sealed tightly in the connection or assembling plane toward the outside by a seal, and for the exchange or replacement of the sediment container are constructed moveable relative to each other. In accordance with the invention the settling vessel is supported with a roller wagon on running rails, which roller wagon has longitudinally variable supports which each comprises a telescopic tube with a spring arranged therein. The water-tight and pressure-tight connection of the settling vessel can than take place with known tensioning or clamping eccentrics against the biasing action of the springs. With such a purification device first there exists the usual separation of the sediment parts from the water, whereby the sediment accumulating as slurry collects or aggregates in the sediment container, which during the purification is located under the settling tank. The collection of the sediment and the pressure of the water column standing thereabove lead thus to the compacting of the slurry in the sediment container, and in the presence of active materials, for example cement and/or lime, it leads to hardening and settling, and to the formation of a relatively rigid block. The sediment accumulating as slurry and the therein contained active materials are converted or reduced thus to a relatively solid or firm block, which without more can be dumped or deposited. It is also possible to use the end product which is concentrated with the active materials, for example cement and/or lime, as raw material for the production of feed, manure or as filling material for other products.

A purification apparatus constructed in accordance with the present invention has the advantage that the sediment container can be used as a "container" in order to ship the end product in the usual manner to the dump or for further processing.

In one purification system for waste water which is concentrated with cement and/or lime and additives, the settling vessel of the purification apparatus of the invention advantageously connects at the inlet a device for the separation of the granular additives from the solid material-water mixture and a collection tank connected at the outlet for the washing- and industrial-water. The device for separating the granular additives from the sediment-water mixture comprises a vibrating screen for retaining an overflow of granules larger than 0.2 mm from passing therethrough and for permitting material smaller than 0.2 mm to pass therethrough, a supply line for feeding the material smaller than 0.2 mm passing through the screen into the settling vessel, and a purge for supplying washing water from the collection vessel and for spraying same onto the vibrating screen.

The device for the separating of the granular particles or additives from the solid matter-water mixture can comprise a known per se vibrating screen, whereas the collection tank advantageously is divided into a first chamber for the washing water and a second chamber connected at the outlet side for the industrial water. For the winter operation, between the two chambers there can be arranged a third heatable compartment for the industrial water.

A purification system with the therein used purification apparatus, constructed according to the invention, has the advantage that the accumulating wastes are considerably reduced since the granular additives and the alkaline waste water can again be fed back into the circuit course. In this manner a complete branch of industry, which previously was regarded as a producer of particular waste, is transferred into the condition to further purify and process its own wastes. A considerable unburdening of the refuse dumps is associated with this.

With the above and other objects and advantages in view, the present invention will be more clearly understood from the following detailed description of preferred embodiments in connection with the accompanying drawings, of which:

FIG. 6 is a side elevation view of a device for exchanging a sediment container of the purifying device;

FIG. 7 is a broken away half sectional view of the same FIG. 6 device in another side view;

Figure 1:
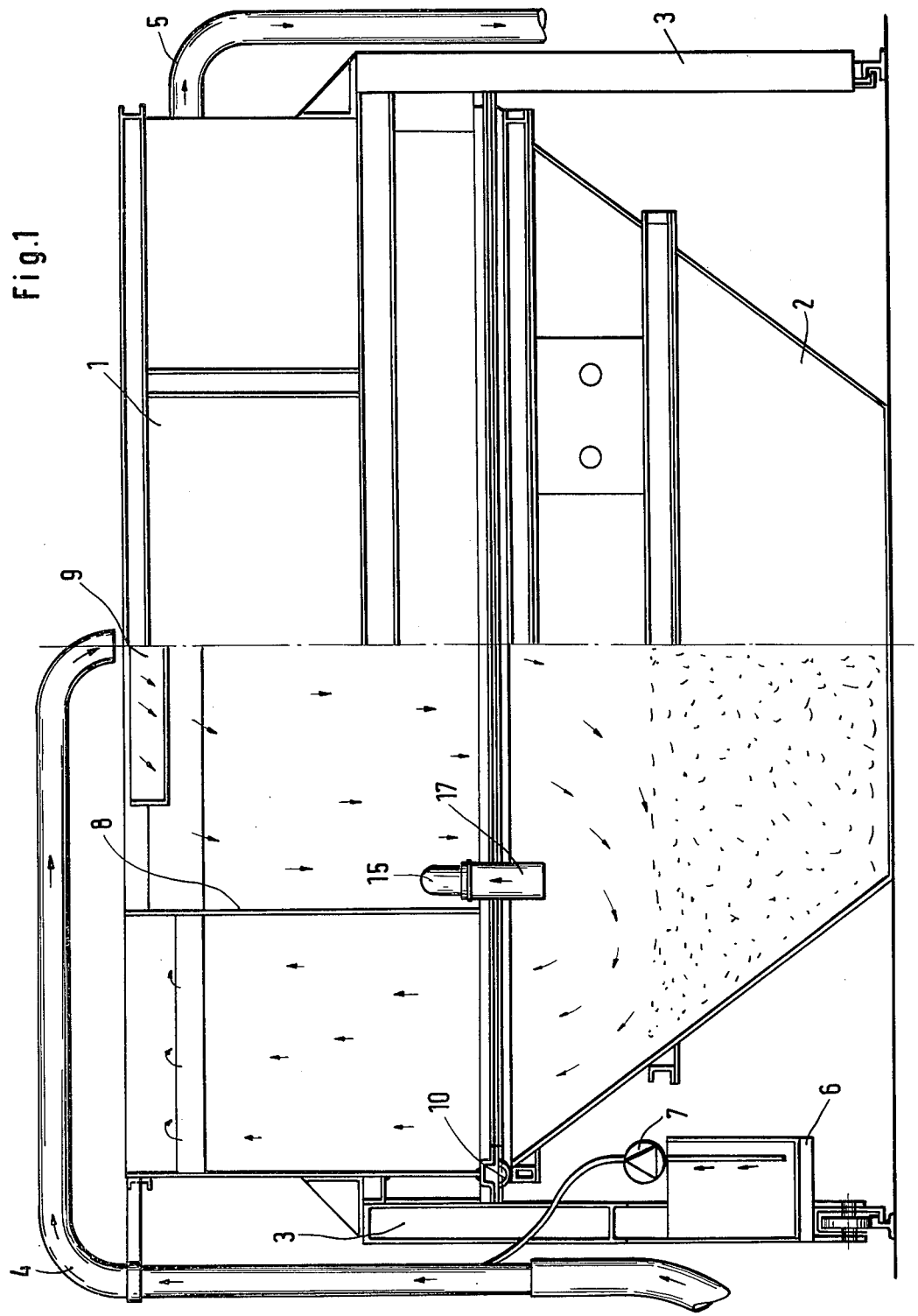
FIG. 1 is a side elevational view of a purifying apparatus in accordance with the present invention partially in section.
Figure 2:
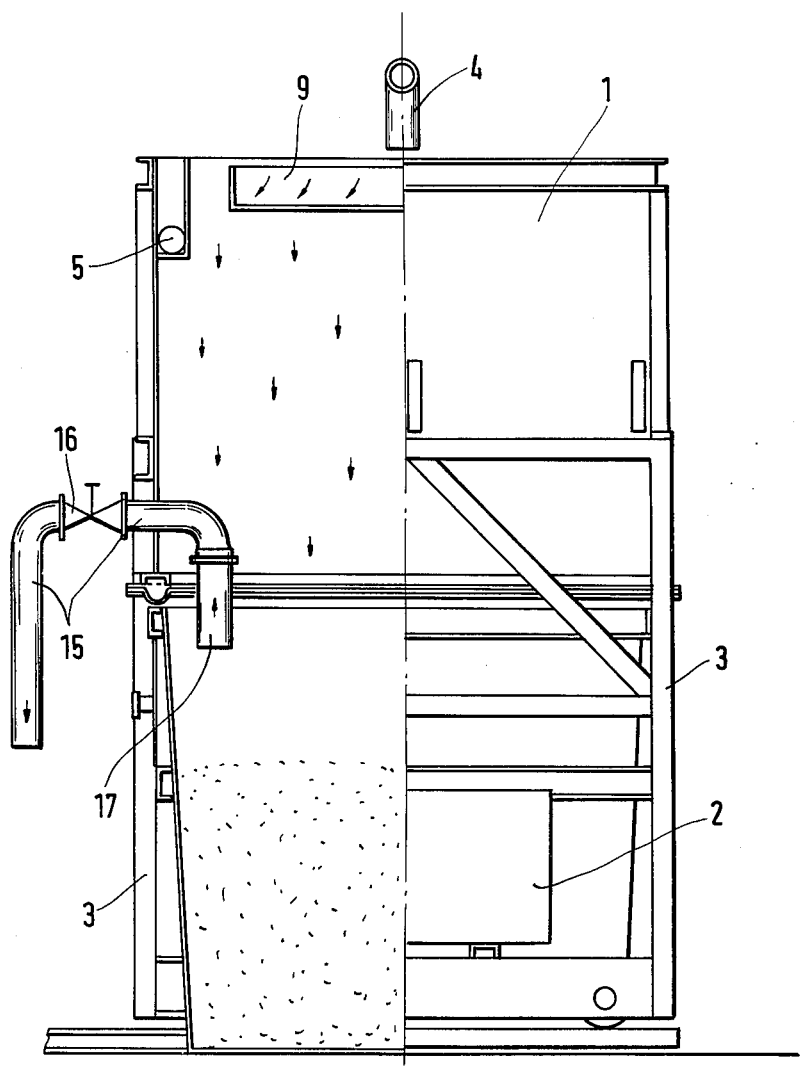
FIG. 2 is another side elevation view of the device according to FIG. 1 partially in section.

Referring now to the drawings, and more particularly to FIGS. 1 and 2, there is illustrated a purifying apparatus in accordance with the present invention which has a settling vessel 1 and a conically charging sediment container 2 which is separate therefrom. The settling vessel 1 is suspended on a portal type carriage or moveable frame 3, which can be moved on rails or the like relative to the sediment container 2. A supply line 4 for the dirty water and an overflow line 5 for the purified industrial water are fastened on the settling vessel 1. Further on the carriage 3 there is fastened a container 6 for a flocculation preparation and on the latter and thus likewise on the carriage 3, a dosing pump 7. The flocculation preparation can be injected by means of an injection hose or tube into the supply line 4 for the dirty water.

A cylindrical insert member 8 is located in the settling vessel 1 and in the insert member 8 a deflection plate 9 is centrally located at the upper side over which the supply or feed line 4 enters. As indicated in FIG. 1 by the arrows, the dirty water which is mixed with the flocculation agent is brought over the deflection plate 9 into the inner space of the cylindrical insert member 8, sinks in the latter with the removal, depositing and sedimentation of the sediment particles downwardly, whereby the sediment particles accumulate over again and again in the sediment container 2, while the purified or cleaned industrial water climbs upwardly in the settling vessel 1 outside of the cylindrical insert member 8, and there is carried away via the overflow line 5. In this purifying phase the settling vessel 1 and the sediment container 2 are openly connected in communication with each other over a seal 10 lying in their connection plane.

Figure 3:
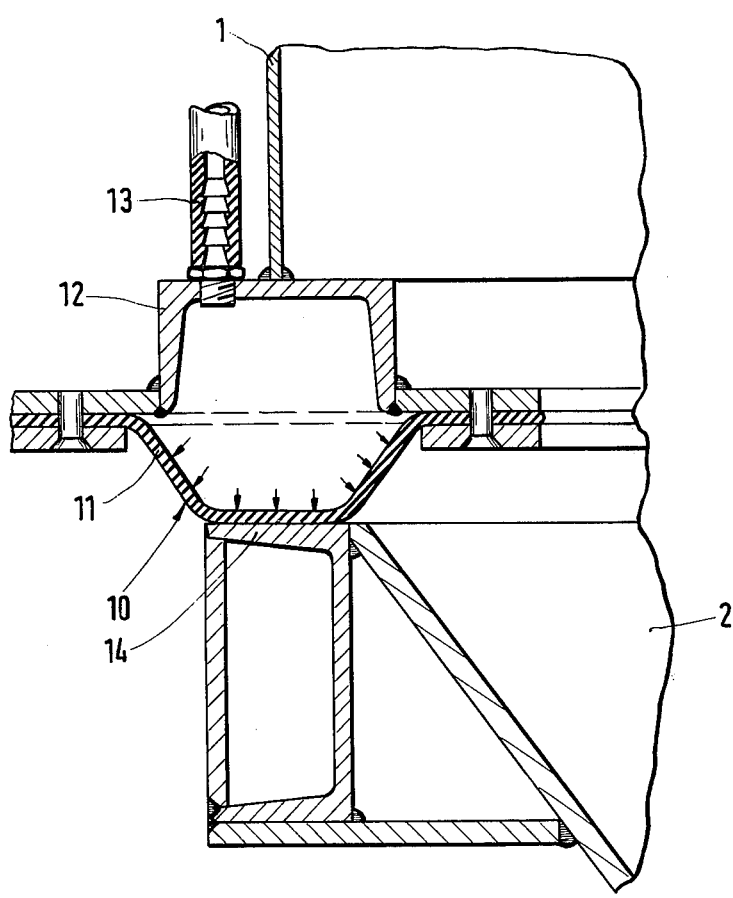
FIG. 3 is enlarged cross-sectional view of a part of the seal of the purifying device according to FIGS. 1 and 2.

In FIG. 3 the pneumatic inflatable sealing 10 is illustrated. Thereby on the lower edge of the settling vessel 1, which edge lies in the connection plane, a membrane 11 made of a highly elastic rubber is flange mounted thereon. The membrane 11 forms an annular spaced with a U-shaped profile section 12. The annular space can be inflated by means of an air conduit 13. On the upper edge of the sediment container 2, a sealing surface 14 is provided opposite the membrane 11. With the filling up or inflating of the annular space, the membrane 11 presses liquid-tight sealingly against the sealing surface 14 of the sediment container 2. If an exchange or replacement of the sediment container 2 takes place, it suffices to somewhat reduce the pressure in the annular space in order to be able to move the settling vessel 1 relative to the sediment container 2 without more.

During an exchange of the sediment container 2, at first the settling vessel 1 is emptied. For this a particular water outlet 15 is provided on the lower end of the latter, the water outlet 15 having a valve 16. The water outlet 15 of the settling vessel 15 extends or points with an elastic or flexible hose or tube 17 upto the sediment container 2. The hose or tube piece 17 guarantees by its elasticity the ability of movement of the settling vessel 1 and the sediment container relative to each other.

Particularly advantageous is an embodiment in which a further, additional sediment container 2 stands in the moving direction of the settling vessel 1 next to the then present sediment container 2 disposed in operation. During the exchange, it is then sufficient to empty the settling vessel 1 via the water outlet 15 in the adjacent sediment container 2, then the settling vessel 1 is moved by means of the carriage 3 and all corresponding units and conduits fastened thereon over the adjacent sediment container 2 and there the connection is made by means of and over the sealing 10. The full sediment container 2 can then be transported away without any more to be done.

The point of time of the exchange is advantageously supervised by a full-level condition monitor and indicator device of known per se construction which is secured to the sediment container 2.

In the course of the purification, in the sediment container 2 there is obtained a considerable compression, and in presence of active materials, for example, cement and/or lime, a solidification or hardening of the sediment material, which then accumulates in solid block form and a dumpable or depositable without requiring additional treatment. In order to be able to dump out the sediment block from the sediment container 2 into the dump, it is advantageous to line or cover the sediment container 2 initially with a foil or to spray the walls before the beginning of operation with a forming oil which prevents sticking.

The movement of the settling vessel 1 can take place longitudinally- or cross-sided relative to the sediment container 2. These two possibilities respectively are indicated by the embodiments according to FIGS. 1 and 2 on the one hand, and on the other hand according to FIG. 4.

Figure 4:
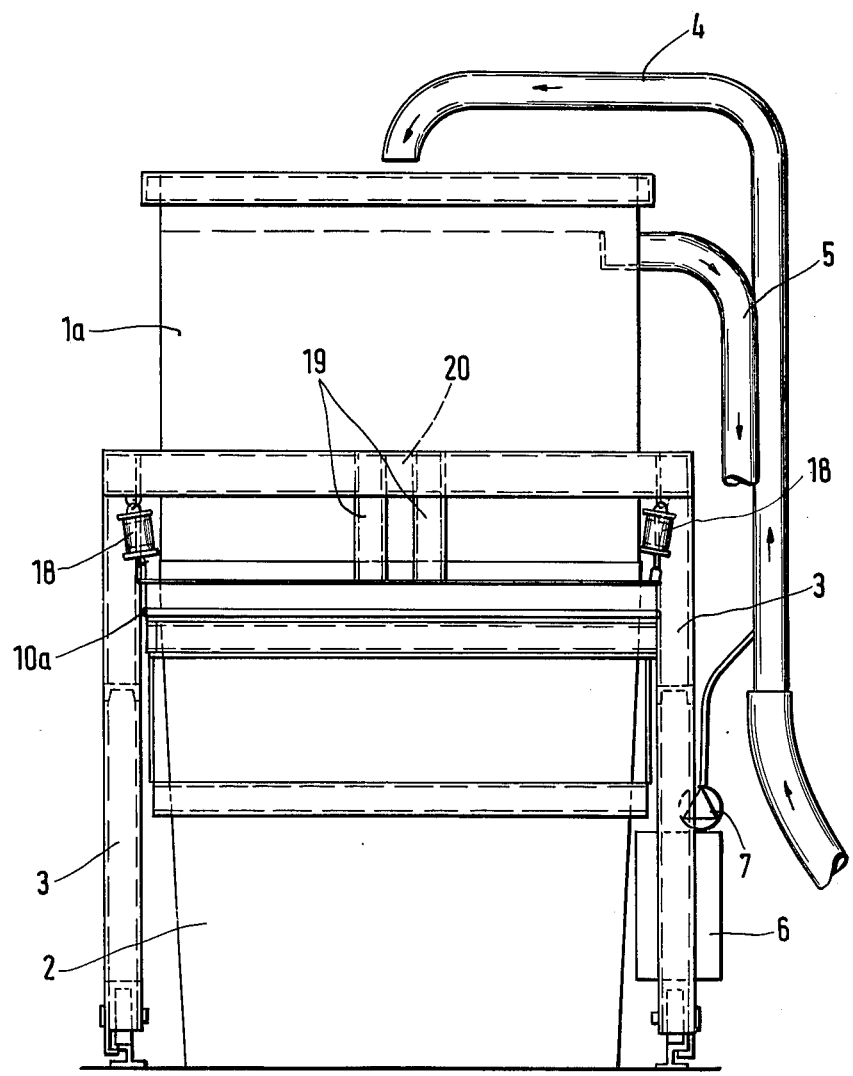
FIG. 4 is a side elevation view of another embodiment of a purifying device in accordance with the present invention.

With the embodiment illustrated in FIG. 4 the same basic construction is provided in principle and the same parts are designated with the same reference characters. The difference with respect to the embodiment of FIGS. 1 and 2 resides in a somewhat other manner of securing and suspending of the settling vessel 1a on the carriage 3 and in another embodiment of the sealing 10a in the connection plane.

Figure 5:
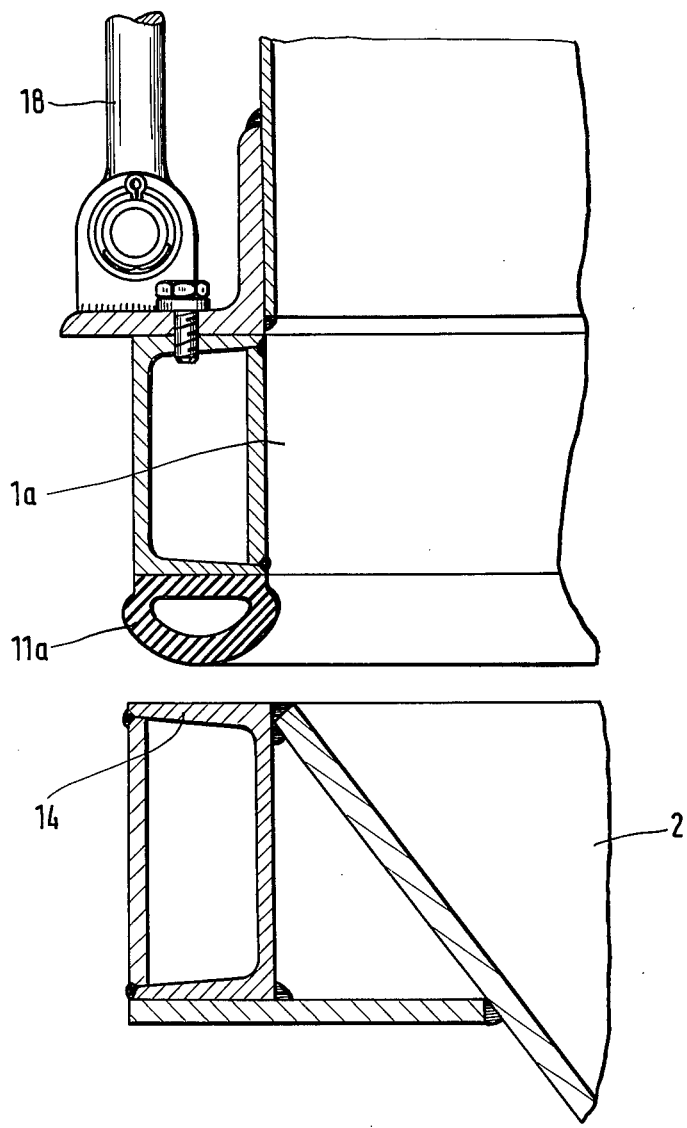
FIG. 5 is an enlarged cross-sectional view of a part of the seal of the purifying device according to FIG. 4.

In the embodiment according to FIG. 4, the settling vessel 1a is suspended, by means, preferably, of four cylinder units 18 which can be actuated hydraulically or pneumatically, in a direction moveable toward and away from the sediment container 2, on the carriage 3. In FIG. 5 the piston rod belonging to the cylinder unit 18 is illustrated. Moreover a sealing ring 11a made of a highly elastic rubber or the like is fastened on the lower edge of the settling vessel 1a, which lower edge lies in the connection plane, whereas the sediment container 2 has on its upper edge a pressing on surface 14 for cooperation with the sealing ring 11a. By this embodiment during an exchange of the sediment container 2, after the settling vessel 1a has been emptied of water, the settling vessel 1a is raised in comparison to the sediment container 2 by means of the cylinder units 18 and then moved to an adjacent sediment container 2 where it is again lowered by means of the cylinder units 18, whereby the sealing ring 11a then presses water-tight and pressure-tight on the sealing surface 14 of the sediment container 2.

In order to be able to carry out raising and lowering of the settling container 1a in an exactly defined manner, two guide rails 19 are secured laterally at several positions of the settling vessel 1a spaced from one another, between which there is provided a guide piece 20 which is secured on the carriage 3.

Figure 8:
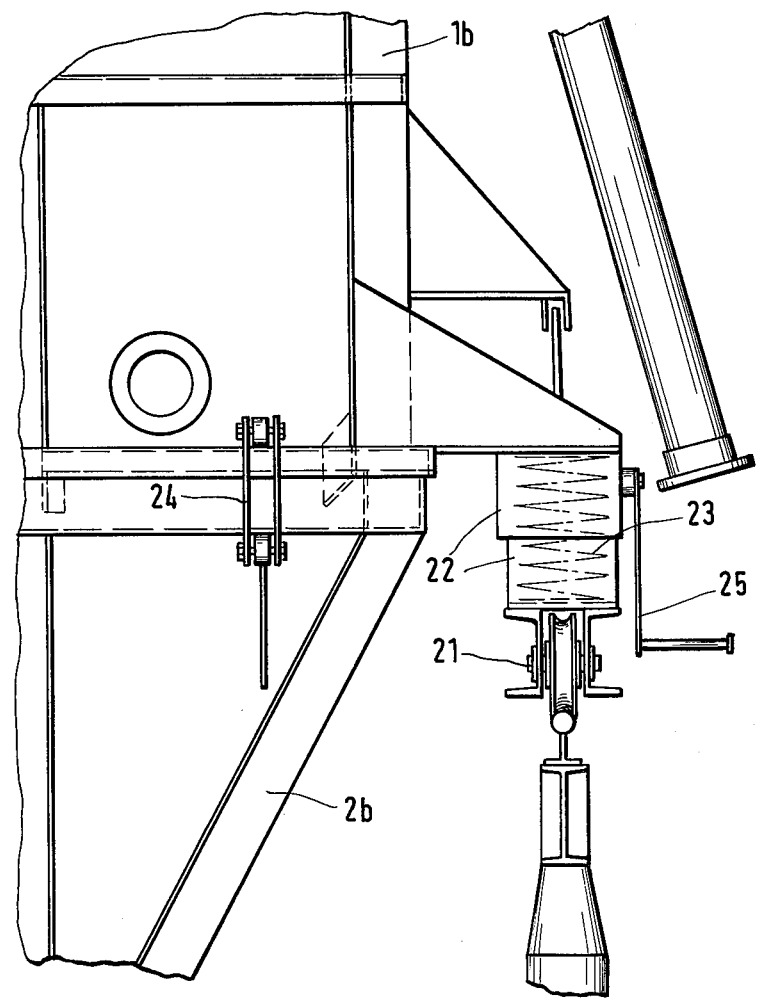
FIG. 8 is an enlarged broken away section of FIG. 7.

According to the embodiment illustrated in FIGS. 6 – 8, the settling vessel 1b is supported with a roller wagon or car 21 on raised high-positioned guide rails 19a. Between the settling vessel 1b and the roller wagon 21 there are arranged telescopic supports 22 which are made of tubular or pipe sections which contain a spring 23. The pressure-tight connection of the settling vessel 1b with the sediment container 2b is brought about in this embodiment with known per se tensioning or clamping eccentrics, which press the seal 10 together against the biasing action of the springs 23. After opening the tensioning or clamping eccentrics 24, the settling vessel 1b is lifted with two front sided arranged winches or hoists 24 and held by the springs 23 in the horizontal position so that it can be moved unhindered with the roller wagon 21 relative to the sediment container 2b.

Figure 9:
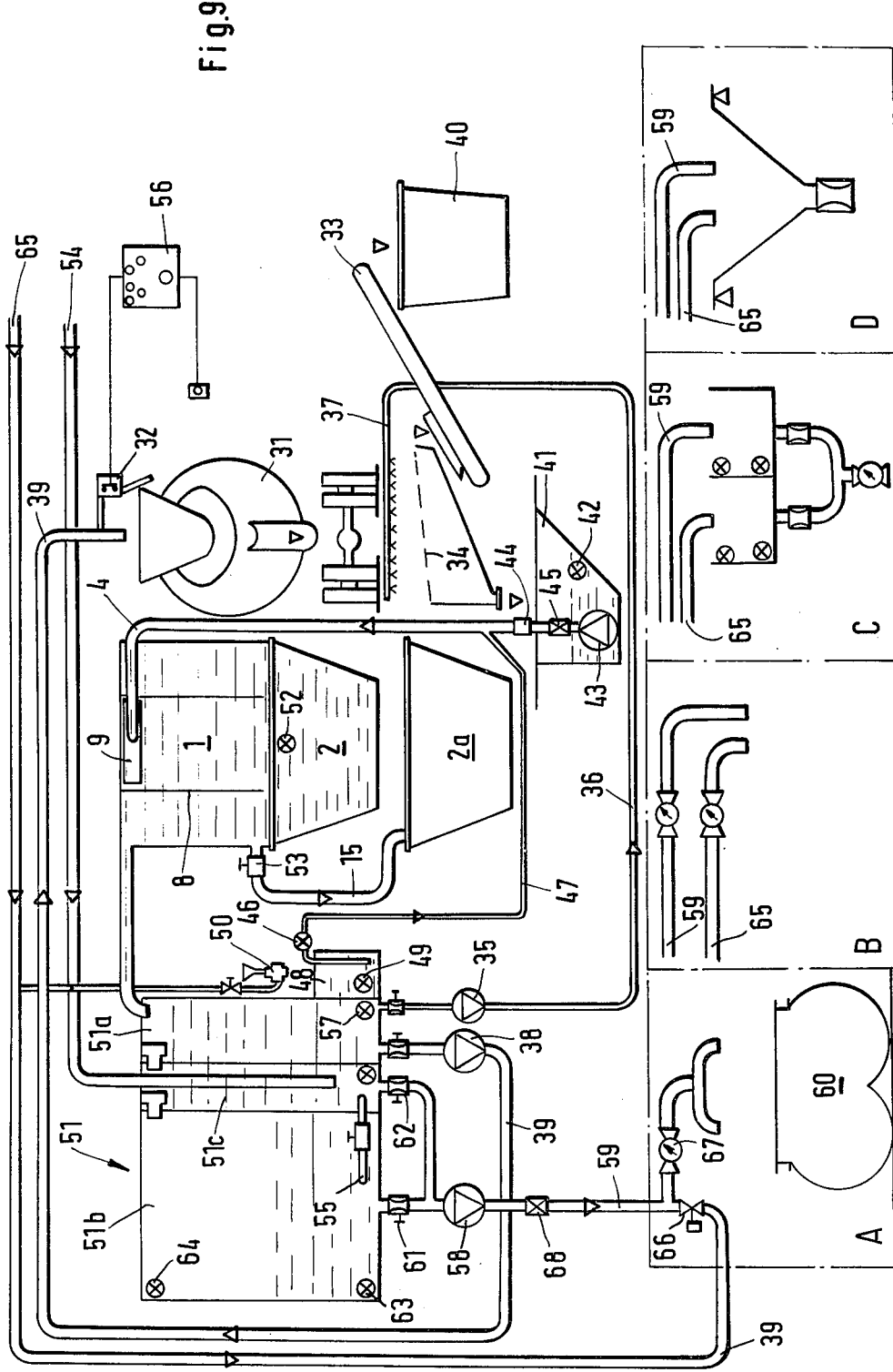
FIG. 9 is a flow diagram of a purification system for the purifying station of concrete mixing vehicles with a purifying device.

Referring now again to the drawings, and more particularly to FIG. 9, a flow diagram is presented of a purification system for the purifying station of concrete-mixing vehicles. This purification system with a connected purifying device has the following construction and course of operation:

A transport mixer 31 operates a pendulum switch 32 with its inlet hopper. In this manner conveyor belt 33, a vibrating or oscillating screen 34 and a compression pump 35 are operated which by means of a conduit 36 feeds a spray device 37 with washing or purging water for the vibrating screen 34. The purging or washing water which is located in the drum of the transport mixer 31, and which washing water pours or is filled therein with a compression pump 38 via a purging conduit 39, is rotated out from the drum and discharged onto the oscillating screen 34. The discharged mixture is separated in passage to under 0.2 mm size particles and deposits or is left in the overflow with more than 0.2 mm size particles on the conveyor 33 which conveys the washed out mixed sand or rubble material into a container 40. The sediment-water mixture which accumulates as slurry in passage through the oscillating screen 34 is conducted into a pump sump 41 and operates a slurry pump 43 by means of a level switch 42. By means of the feed line 4, the sediment arrives in the settling vessel 1 of the actual purification device. By a safety switch 44 in the feed line 4, the slurry pump 43 is stopped and a back-pressure valve or check valve 45 prevents the back flow or reverse flow of the sediment-water mixture which stands in the feed line 4. After the termination of the purging or washing process, the transport mixer 31 travels away from its washing position so that the pendulum switch 32 occupies its neutral position and after termination of a predetermined time, by means of a time relay, the conveyor 33, the oscillating screen 34 and the compression pump 35 are turned off.

Parallel to the slurry pump 43, a dosing pump 46 for a flocculation preparation is operated and injects via an injection or seed tube 47, the flocculation preparation which is mixed or prepared in a container 48 into the sediment-water mixture which flows through the feed line 4. A safety switch 49 prevents, during a minimum level condition in the container 48, a running or starting of the entire purging or washing devices. After the mixing, dilution or preparation of a new liquid with the flocculation preparation by means of a disperser 50, the slurry pump 43 and the dosing pump 46 again can be turned on.

The sediment-water mixture with the injected flocculation material flows via the feed conduit 4 first in the upper settling vessel 1. Thereby the two liquids are vigorously thoroughly mixed by the turbulent flow in the feed line 4 and by a tangential application in the deflection plate 9. Thereby the superfine or finest parts of the particles which are suspended in the sediment-water mixture combine and are able to sink in the sediment container 2 due to their thereby increasing weight. The flowing speed of the water which sinks in the cylindrical insert member 8 and which rises in the outer chamber of the settling vessel 1 is smaller than the sinking speed of the superfine parts, so that the water which rises in the outer chamber completely cleaned or purified from the mechanically sinking sediment parts, overflows into a first chamber 51a of a collection vessel 51. By means of a full-level condition indicator 52, the maximum full level in the sediment container 2 is indicated so that by opening of a squeeze or pinch type valve 53, the water which is located in the settling vessel 1 can run or drain off by means of the water outlet 15 into a further sediment vessel 2a.

After the discharge of the water from the settling vessel 1, the latter can be exchanged on the adjacent arranged sediment vessel 2a. Thereafter the purifying of the sediment-water mixture can be resumed or continued. The sediment vessel 2 which is filled with the deposited or removed slurry is carried away. The removed slurry accumulates in block form and by dumping in a refuse station or by further processing only still has a low residual moisture or liquid content.

The cleared industrial water which overflows from the settling vessel 1 is buffered in the first chamber 51a of the collection vessel 51 and serves as purge water. If the first chamber 51a runs full, the excess runs into a second chamber 51b by a submerged tube, from which the water can be removed as water fit for industrial use. In order to always have a supply of the required quantity of washing water for the washing of the transport mixer 31, the first chamber 51a possesses a corresponding buffer volume.

The continuous running winter operation makes it necessary in different manufacturing installations, and low temperatures to use heated industrial water for the production of concrete. For this purpose, between the chambers 51a and 51b there is arranged a third chamber 51c, which can be heated with hot vapor or steam by means of an immersion vapor or steam conduit 54. According to need, by means of an equalization conduit 55, a balance or volume increase can be provided.

After the transport mixer 31 travels under the purging conduit 39 and the pendulum switch 32 has been actuated, then by means of a pressure switch 56, the compression pump 38 can be switched on and switched off. If the switching off fails or is neglected manually, then after termination of a predetermined time the compression pump 38 is switched off by means of a time relay. A safety switch 57 prevents a dry running of the compression pump 38.

With the further use of industrial water for production, by means of a compression pump 58 and a conduit 59, the then existing present water quantity under the circumstances is drawn upon, for example for a mixing system 60. In this manner the industrial water, depending on the type of operation, can be withdrawn from the chamber 51b or 51c, whereby a squeeze or pinch valve 61 or 62 is to be opened and to be closed. Two safety switches 63 and 64 are operatively connected in the chamber 51b independent from one another and serve as a safety or guarantee against dry running for the compression pump 58 and as an overflow safety for the chamber 51b, respectively.

Since, not for all types of concrete is the purified alkaline industrial water used again for production, or the purified industrial water quantity may not be sufficient for the production, and the quantity per cubic meter of finished concrete to be given off for the mixing system 60 must be exactly dosed, yet the bringing together or uniting of industrial- and city- or well- water by conduit 65 due to legal regulations is not always possible, thus the feeding possibilities and doses of the industrial- and fresh- water quantities must be brought about by different alternatives A, B, C, D, which are illustrated in FIG. 9.

By the alternative A for the supplying of industrial- or well- water to a mixing system 60, with requirement of industrial water from the chambers 51b or 51c, a magnetic valve 66 closes, so that the compression pump 58 can feed the mixing system 60 via the line 59 and a water meter 67.

If well-water is to be required over the line 65, then the magnetic valve 66 is opened and doses likewise, via the water meter 67, into the mixing system 60, whereby a check valve 68 or back pressure valve in the line 59 prevents an intake of the well water into the collection vessel 51. The conduit guide or control according to the alternative A is only possible if the fresh water can be withdrawn from well devices and is not suitable as drinking water.

If city water should be used as fresh water, a separate water guide or control must be provided corresponding to the alternatives B, C, or D, illustrated in FIG. 9.

A water-tight and pressure-tight connection of the settling vessel 1, 1a or 1b with the sediment containers 2, 2a or 2b, respectively, further may be brought about or aided by means of clamping or tensioning excentrics 24.

While we have disclosed several embodiments of the present invention, it is to be understood that these embodiments are given by example only and not in a limiting sense.

We claim:
1. A purification apparatus for water purification with a settling device for sediment, comprising
 a settling device comprising a settling vessel and a separate sediment container,
 said settling vessel and said sediment container being in open connection with one another in assembled condition for purification of water and define a connection plane,
 sealing means for sealing said settling vessel and said sediment container in said connection plane toward the outside,
 and settling vessel and said sediment container being moveable relative to each other for exchange of said sediment container,
 said settling vessel having a lower edge,
 said sediment container having an upper edge,
 said sealing means comprising a profile seal arranged on said lower edge and a cooperating sealing surface formed on said upper edge,
 guide rails, said settling vessel is operatively moveably mounted on said guide rails,
 a roller wagon arranged under said settling vessel, said roller wagon includes longitudinally variable supports, said settling vessel is supported on said supports,
 each of said supports comprises a telescopic tube arrangement with a spring means for operatively biasing said telescopic tube arrangement into an extended condition.

2. A purification system for waste water concentrated with cement and/or lime and additives, with a purification apparatus for water purification with a settling device for sediment, comprising
 a settling device comprising a settling vessel and a separate sediment container,
 said settling vessel and said sediment container being in open connection with one another in assembled condition for purification of water and define a connection plane,
 sealing means for sealing said settling vessel and said sediment container in said connection plane toward the outside,
 said settling vessel and said sediment container being moveable relative to each other for exchange of said sediment container,
 means for separating granular additives from a sediment-water mixture in operative inlet communication with and to said settling vessel,
 a collection vessel means for collecting washing- and industrial- water in outlet communication with and from said settling vessel,
 said means for separating granular additives from the sediment-water mixture comprises,
 vibrating screen means for retaining an overflow of granules larger than 0.2 mm from passing therethrough and for permitting material smaller than 0.2 mm to pass therethrough,
 a supply line means for feeding the material smaller than 0.2 mm passing through said screen means into said settling vessel,
 purge means for supplying washing water from said collection vessel means and for spraying same onto said vibrating screen means.

* * * * *